United States Patent [19]

Saurer et al.

[11] Patent Number: 5,598,380
[45] Date of Patent: Jan. 28, 1997

[54] COMPOSITE WALL, NOTABLY MOTOR VEHICLE WINDSHIELD, INCLUDING AN ULTRASONIC DEVICE FOR DETECTING THE PRESENCE OF FOREIGN BODIES ON ONE OF ITS FACES

[75] Inventors: Eric Saurer, Bevaix; Jean-Pierre Mignot, Peseux; Roland Jeanmonod, Neuchâtel, all of Switzerland

[73] Assignee: Asulab, S.A., Bienne, Switzerland

[21] Appl. No.: 373,076

[22] Filed: Jan. 17, 1995

[30] Foreign Application Priority Data

Feb. 8, 1994 [FR] France .................................. 94 01403

[51] Int. Cl.⁶ .............................. H04R 17/00; G05B 5/00
[52] U.S. Cl. .................................. 367/140; 318/DIG. 2; 318/483; 318/460; 296/96.15
[58] Field of Search .......................... 318/DIG. 2, 483, 318/460; 296/96.15; 367/140

[56] References Cited

U.S. PATENT DOCUMENTS

| 5,138,241 | 8/1992 | Shimizu et al. | 318/483 |
| 5,266,873 | 11/1993 | Arditi et al. | 318/483 |
| 5,414,257 | 5/1995 | Stanton | 318/DIG. 2 |
| 5,432,415 | 7/1995 | Ittah et al. | 318/483 |

FOREIGN PATENT DOCUMENTS

| 0512653 | 11/1992 | European Pat. Off. |
| 3528009 | 2/1987 | Germany. |
| WO94/00319 | 1/1994 | WIPO. |

*Primary Examiner*—J. Woodrow Eldred
*Attorney, Agent, or Firm*—Pollock, Vande Sande & Priddy

[57] ABSTRACT

The composite wall comprises a first sheet and second sheet separated by an intermediate layer as well as an ultrasonic detection device placed on a face of said second sheet and comprising a transducer element able to emit an incidental ultrasonic signal of frequence f, and able to receive an ultrasonic signal reflected on a face of said first sheet. The intermediate layer comprises at least facing the transducer element, an inserted element whose two faces are respectively in close contact with the first and second sheets. Further, the frequence f of the transducer element satisfies the following relationships:

$$f \approx K_1 \cdot V_1/2e_1 \approx K_2 \cdot V_2/2e_2 \approx K_3 \cdot V_3/2e_3$$

where $K_1$, $K_2$ and $K_3$ are defined integers, $e_1$, $e_2$ and $e_3$ are respectively the thickness of the first sheet, the second sheet and the inserted element, and $V_1$, $V_2$ and $V_3$ are respectively the propagation speeds of an ultrasonic wave in the first sheet, in the second sheet and in the inserted element.

20 Claims, 2 Drawing Sheets

COMPOSITE WALL, NOTABLY MOTOR VEHICLE WINDSHIELD, INCLUDING AN ULTRASONIC DEVICE FOR DETECTING THE PRESENCE OF FOREIGN BODIES ON ONE OF ITS FACES

FIELD OF THE INVENTION

The invention concerns a composite wall and more particularly, a motor vehicle windshield including an integrated ultrasonic device for detecting the presence of foreign bodies on a predetermined part of one of its faces, the composite wall exhibiting a structure such that it enables the sensitivity of the detection device to be increased.

BACKGROUND OF THE INVENTION

Various devices for detecting the presence of foreign bodies on the surface of a window are already known. In most cases, advantage is taken of the fact that the transmission of an electromagnetic or elastic wave in the material of the wall is affected by an alteration of the medium in which the wall is located.

Thus, in the case of a windshield of a motor vehicle, the amplitude of an ultrasonic signal reflecting on the surface of an element of the latter may be more or less attenuated as a function of the presence of a foreign body on the surface of said element of the windshield. Detection of this variation in amplitude is thus representative of the presence of foreign bodies on the surface of the windshield and consequently enables a usable control signal to be provided, for example for starting and stopping the operation of a cleaning device.

Patent application EP 0 512 653 proposes an automatically controlled cleaning device, in particular for motor vehicle windshields, which uses this principle and in which an ultrasonic transducer effecting the functions of transmission and reception is directly fixed onto the interior surface of a windshield.

This device operates in a satisfactory fashion when it is used with so-called symmetrical windshields, that is to say comprising two sheets of glass of the same thickness joined together by a connecting layer such as a layer of polyvinyl butadiene (PVB).

When a transducer sets into vibration two sheets of glass joined together by a connecting layer (PVB layer), in order to obtain satisfactory sensitivity to the detection of the presence of foreign bodies on the surface of the sheet of glass remote from the transducer, the vibration amplitude of that sheet of glass must be maximal. This condition is only achieved if the resonant frequency f of the wave emitted by the transducer is substantially equal to one of the resonant frequencies of each of the sheets of glass forming the windshield. Thus, for one sheet i of thickness $e_i$, f must be close to one of the frequencies:

$$f_{i,K} = K.v/2e_i \qquad (1)$$

where $f_{i,K}$ represent the resonant frequencies of K order (K=1, 2, 3, ..., n) of sheet i, and v is the speed of the wave emitted by the transducer in the glass in question.

It can be seen therefore that it is easy, in the case of a symmetrical windshield, to select a transducer emitting a signal whose wavelength is adapted to this windshield as the thicknesses of the two sheets of glass forming the windshield are identical. On the other hand, the optimal operating conditions of such a device are no longer so easily fulfilled when the transducer is applied to a so-called asymmetrical windshield, that is to say comprising two sheets of glass of different thicknesses. In such case, to satisfy the above conditions, it is necessary to find a transducer whose frequency f is substantially equal to:

$$f_1 = K_1.v/2e_1 \text{ and to } f_2 K_2.v/2e_2$$

where $K_1$ and $K_2$ are non zero integers, and $e_1$ and $e_2$ are the respective thicknesses of the two sheets of glass, $f_1$ and $f_2$ being in this case higher order harmonics of the respective resonant frequencies of the two sheets.

Taking account of the order of size of the thicknesses of the sheets used in a large number of applications (2 to 3 mm), it has been confirmed that these conditions were generally satisfied for high frequencies corresponding to harmonics of the order of 4 to 5 of these resonant frequencies (typically of the order of 5 to 10 Mhz).

The above reasoning disregards, however, the connecting layer which, through the material of which it is formed, absorbs a large part of the ultrasonic waves which pass through it, all the more so when the frequency is high. This connecting layer thus prevents a satisfactory coupling of the two sheets in that it it does not allow optimal sensitivity to be achieved for the detection of the presence of foreign bodies on the surface of the sheet furthest from the transducer.

Another disadvantage of this connecting layer lies in the fact that the speed of propagation of an ultrasonic wave in the material (PVB) of which it is formed varies significantly with the temperature, so that it is impossible to find a frequency f satisfying the equation (1) for the sheets and the connecting layer and for an advantageous range of usage temperatures from a practical point of view.

Another disadvantage of this connecting layer lies in the fact that the acoustic impedance z of the material forming the connecting layer ($z_{pvb}=2.10^6$ Kg/m$^2$.s), is very far from that of the sheets ($z_{glass}=15.10^6$ Kg/m$^2$.s), so that the transmission of the ultrasonic signal at the sheet-connecting layer and connecting layer-sheet interfaces is weak.

It is also to be noted that the use of high frequencies has the disadvantage of requiring the use of thin transducers, which are consequently fragile and delicate to handle.

SUMMARY OF THE INVENTION

An aim of the invention is thus to overcome the disadvantages of the aforementioned prior art by providing a composite wall comprising a device for ultrasonically detecting the presence of foreign bodies on one of its faces, this device exhibiting a great detection sensitivity, whether the device has a symmetrical or asymmetrical structure.

The invention thus concerns a composite wall comprising at least a first sheet having a first thickness, a second sheet having a second thickness, said sheets being separated by an intermediate layer having a third thickness, said wall also comprising an ultrasonic detection device cooperating with an external face of said second sheet to detect the presence of foreign bodies on an external face of said first sheet, said detection device comprising transducer means able to emit an incidental ultrasonic signal of frequence f, said transducer means also being able to receive an ultrasonic signal reflected on said face of said first sheet representative of the presence or absence of said foreign bodies, characterised in that the intermediate layer comprises, at least facing the transducer means, a recess in which is placed an inserted element whose two opposite faces are respectively in close contact with the first and second sheets, in that frequence f of transducer means satisfies the following relationships:

$$f \approx K_1 \cdot V_1/2e_1 \approx K_2 \cdot V_2/2e_2 \approx K_3 \cdot V_3/2e_3$$

where $K_1$, $K_2$ and $K_3$ are non zero integers, $e_1$, $e_2$ and $e_3$ are respectively the thickness of the first sheet, the second sheet and the inserted element, and $V_1$, $V_2$ and $V_3$ are respectively the propagation speed of an ultrasonic wave in the first sheet, in the second sheet and in the inserted element.

Thus the transmission of the f frequency ultrasonic wave emitted by the transducer is achieved through three layers which resonate at this frequency, so that the sensitivity of the detection device is greatly improved.

Further the invention enables the easy selection of a transducer emitting a signal whose frequency is optimal whatever the thicknesses of each of the layers forming the composite wall.

According to one aspect of the invention, the first and second sheets are formed in materials having substantially equivalent acoustic impedences, the material of the inserted element having an acoustic impedance whose value is comprised between approximately 0.6 and approximately 1.7 times the value of that of the first and second sheets.

The transmission of the signal generated by the transducer is thus achieved with a minimum reflection loss at the interfaces of the layers forming the composite wall, so that the sensitivity of the device is further improved.

According to an advantageous characteristic of the invention, the material of the inserted element is malleable, so that the inserted element easily adapts to any curvature of the composite wall.

BRIEF DESCRIPTION OF THE DRAWINGS

Other characteristics and advantages of the invention will appear more clearly upon reading the following description of an embodiment of the invention given purely by way of illustrative and non-limitative example, said description being given in conjunction with the drawings in which.

DETAILED DESCRIPTION OF THE INVENTION

The description of the invention will be made in the framework of an application for the elimination of moist foreign bodies such as rain, snow, mud, etc. present on the surface of a composite window formed by an asymmetrical motor vehicle windshield.

The term asymmetrical window will be used in the following description to mean a composite wall comprising at least a first sheet of a first thickness, and a second sheet of a second thickness less than the first, the two sheets being separated by an intermediate layer which in this example is continuous and also acts to connect the sheets to each other. It goes without saying that, according to an alternative embodiment of the invention, the intermediate layer may be formed by a non solid element such as air, the two sheets then being joined by a sealing frame or suchlike.

At the same time, it is self-evident that the invention is in no manner limited to this application and that it may be advantageously employed within the framework of any other application for the detection of the presence of any foreign bodies on a predetermined part of the surface of a composite wall of a symmetrical or asymmetrical structure formed of materials capable of transmitting an ultrasonic signal, whether they are transparent or not. The term predetermined part will be used to mean the part of the surface of the composite wall which is situated substantially facing the detection means, as will appear more clearly in the following description.

Figure 1:
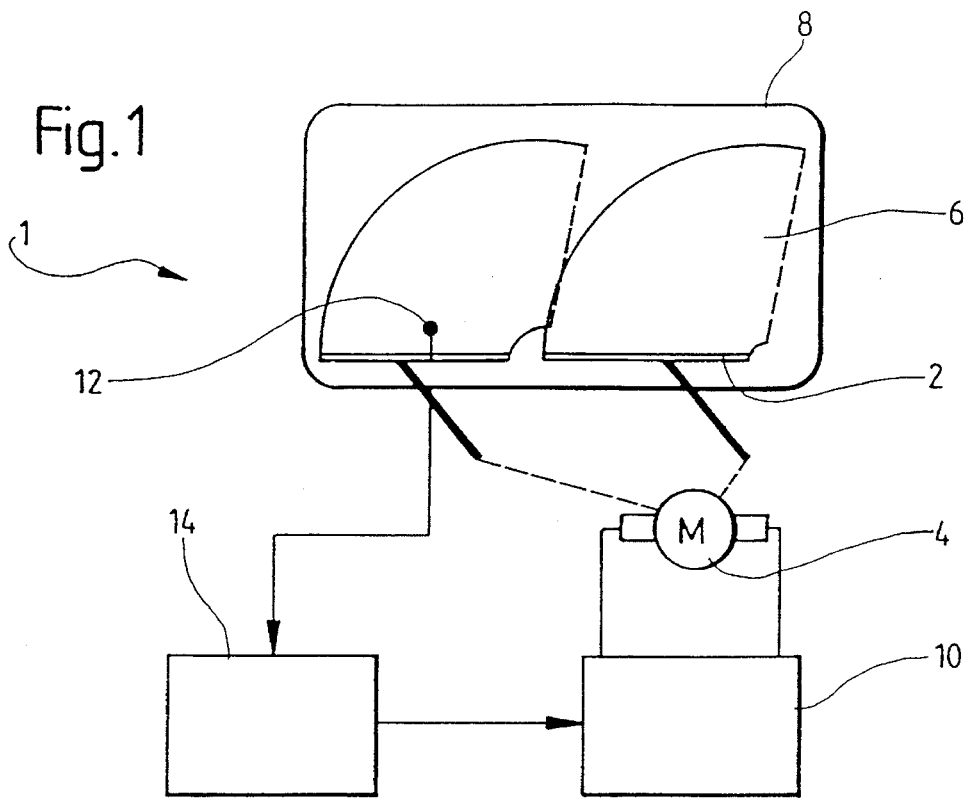
FIG. 1 shows a general schematical diagram of an example of an automatically controlled windshield cleaning system with which a detection device comprising a wall of the invention may be used.

Referring to FIG. 1, there is seen a standard automatically controlled cleaning system of windshield wipers designated by the general reference 1. System 1 comprises windshield wipers 2 mechanically coupled to a motor 4. When the windshield wipers are activated, they sweep respectively zones 6, in the form of a circular sector of a windshield 8. Activating means 10, connected to motor 4, enable the motor to be switched on and off.

The automatic control of the windshield wipers is achieved with the help of a detection device 12, which will be described in more detail below, placed facing one of the zones 6, and a control circuit 14 capable of providing an appropriate control signal to activating means 10 in response to a detection signal originating from detection device 12.

Figure 2:
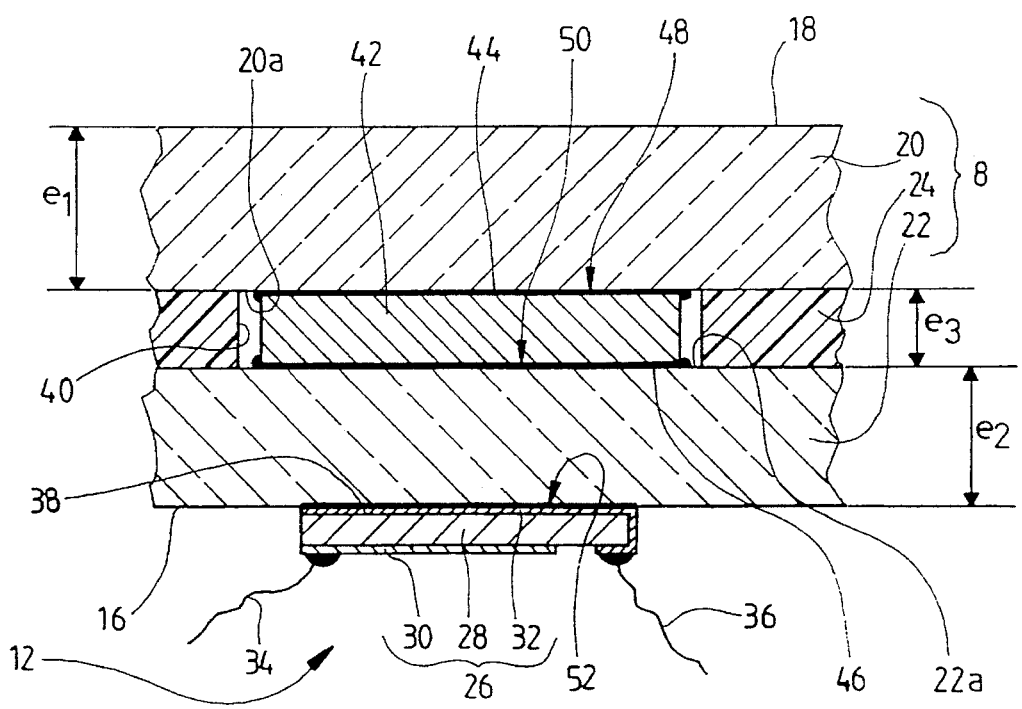
FIG. 2 is a schematical cross-sectional view of a first embodiment of a composite wall according to the invention.

Referring now to FIG. 2, one can see a cross-sectional view of detection device 12, fixed onto the internal face 16 of windshield 8 and which is intended to provide a detection signal representative of the presence of foreign bodies on the exterior surface 18 of windshield 8.

As is seen in FIG. 2, windshield 8 is asymmetrical, that is to say that it includes a first sheet 20 having a first thickness $e_1$ and a second sheet 22 having a second thickness $e_2$. Sheets 20 and 22, formed for example of transparent glass, are assembled by means of a continuous connecting layer 24, also transparent, which may for example be a layer of a polymer such as polyvinyl butadiene (PVB). In this example sheets 20 and 22 have ultrasonic wave transmission characteristics and in particular ultrasonic wave propagation speeds which are identical.

The first sheet 20, which is intended to come into contact with the exterior of the vehicle, typically has a first thickness $e_1$ of the order of 2.6 mm, while the second sheet 22 which is intended to come into contact with the interior of the vehicle, typically has a second thickness $e_2$ of the order of 2.1 mm. The connecting layer itself typically has a thickness of the order of 0.74 mm. It will be noted that the dimensions have been greatly exagerated in the drawing for the sake of clarity.

In this first embodiment, detection device 12 comprises transducer means 26 placed on the internal face 16 of windshield 8, which is formed by the external face of sheet 22, and used, on the one hand, to emit an incidental ultrasonic signal having a frequency f in the thickness of windshield 8, and on the other hand, to receive a reflected ultrasonic signal representative of the presence or absence of foreign bodies on the enternal face 18 of windshield 8, which is formed by the external face of sheet 20.

Transducer means 26 comprise a piezoelectric element 28, for example in the form of a disk, and excitation electrodes 30, 32, intended to be connected respectively to control circuit 14 via conductors 34, 36. Electrode 30 extends across the totality of the face of piezoelectric element 28 situated facing windshield 8, which is called the transmitting/receiving face 38, and over a part of the face opposite said element 28 to facilitate its connection. Electrode 32, insulated from electrode 30, covers the part of said opposite face not covered by electrode 30.

Intermediate or connecting layer 24 comprises, according to the invention, a recess 40 situated facing transducer means 26, in which is placed an inserted element 42 whose two opposite faces 44, 46 are respectively in intimate contact with the opposite faces 20a, 22a of sheets 20 and 22. Inserted element 42 has the configuration of a disk whose thickness is substantially equal to the thickness of intermediate layer 24 formed, in the example shown, by the PVB layer of the windshield when it is finished, or in other words, to the flattened value of PVB layer 24.

Further, the surface of inserted element 42 is preferably substantially equal to the active surface of piezoelectric disk 28.

Intimate contact of inserted element 42 with sheets 20 and 22 means that no air bubbles must be present at the sheet 20/inserted element 42 and inserted element/sheet 22 interfaces.

Inserted element 42 is thus covered on its faces 44 and 46 by a thin film 48, 50 of an adhesive material. Preferably, this adhesive material is a thermomelting adhesive material having an internal fusion temperature less than the softening temperature of the material of layer 14, or which has an almost liquid state at this softening temperature. By way of example, this thermomelting material may be a polymer with an vinyl acetate base.

The thicknesses of layers 48, 50 of adhesive material must be as thin as possible to avoid parasite reflections and too great an absorption of the ultrasonic signal transmitted by transducer 28 at the level of the sheet 20/inserted element 42 and inserted element 42/sheet 22 interfaces. The applicant has determined that the use of layers of adhesive material 48, 50 of respective thicknesses less or equal to $\lambda/20$, where $\lambda$ is the wavelength of said ultrasonic signal of frequence f in the adhesive material, leads to satisfactory results.

It will be noted in this regard that the lateral edges of inserted element 42 are not totally in contact with the internal walls of recess 40 and that there is a space around element 42 in which the excessive adhesive material may be collected.

It will also be noted in this regard that transducer means 16 are fixed to face 16 of sheet 22 by means of a film of glue 52 or by any other appropriate means such as welding, and that the abovementioned condition in connection with layers of adhesive material 48, 50 also applies to the thickness of layer 52.

According to the invention and in order to obtain a good level of sensitivity of the detection device, frequence f of the signal emitted by transducer 28 must satisfy the following relationships:

$$f \approx K_1.V_1/2e_1 \approx K_2.V_2/2e_2 \approx K_3.V_3/2e_3$$

where $K_1$, $K_2$ and $K_3$ are defined integers, $e_1$, $e_2$ and $e_3$ are respectively the thicknesses of sheet 20, sheet 22 and inserted element 42, and $V_1$, $V_2$ and $V_3$ are respectively the propagation speeds of an ultrasonic wave in sheet 20, in sheet 22 and in inserted element 42.

In the example illustrated, as the values of $e_1$, $e_2$ and $e_3$ are imposed by the application, in the present case to a windshield, as speeds $V_1$ and $V_2$ are also imposed by the nature of the material (glass) of sheets 20 and 22, the above equations enable the values of $K_1$ and $K_2$ to be chosen by verifying the following relationship:

$$K_1.V_1/2e_1 \approx K_2.V_2/2e_2$$

and thereby a frequence f to be determined at which sheets 20 and 22 resonate, and thus transducer 28 to be chosen. Once thickness $e_3$ is known, all that remains is to select a material for inserted element 42 for which the propagation speed of an ultrasonic wave in this material $V_3$ verifies the following relationship:

$$V_3 \approx 2f.e_3/K_3 \tag{2}$$

In order to do this, and to further increase the efficiency of the windshield ultrasonic detection device, one will preferably select for the inserted element a material which has an acoustic impedance whose value is between approximately 0.6 and approximately 1.7 times the value of those of sheets 20 and 22.

With regard to sheets 20 and 22, one will select, also in a preferred manner as is the case here, materials which have substantially equivalent acoustic impedances.

In the application described, one will also ensure, for reasons connected to the manufacture of windshields, that the inserted element is malleable so that it assumes the windshield's curvature when it is manufactured.

In order to clarify, for a commercial windshield such as the one described above:

$e_1$=2.6 mm, $e_2$=2.1 mm, $e_3$=0.74 mm, $V_1=V_2=V_{glass}$=5.9×10³ m/s, and $Z_{glass}$=15×10⁶ Kg/m².s Frequence f and the inserted element material may be determined in the following manner:

$f \approx K_1.V_{glass}/2e_1 \approx K_2.V_{glass}/2e_2$ so that $K_2/K_1 \approx e_2/e_1 \approx 0.8 \approx 4/5$.

By selecting $K_1$=5 and $K_2$=4, one finds a value f=5.65 Mhz for the above thicknesses $e_1$ and $e_2$.

According to equation (2) one thus has $$V_{mat.inser.}=4.18/K_3.10^3 \ m/s$$

And by selecting $K_3$=2 one has:

$$V_{mat.inser.}=2.1.10^3 \ m/o$$

This speed value thus enables an appropriate material to be selected in a table, for example lead, in which the propagation speed of an ultrasonic wave is equal to 2.16.10³ m/s.

Further, the value of the acoustic impedance of lead $Z_{lead}$=25 Kg/m².s corresponds to approximately 1.7 times the value of the acoustic impedance of glass which gives a satisfactory transmission of the signal to the glass/lead and lead/glass interfaces (of the order of 70%). Furthermore, lead is a malleable material which is perfectly suited to the application described.

Of course other materials may be selected for the inserted element for this application. Thus, the applicant has confirmed that, to obtain good results, this material will preferably be selected from the group comprising aluminium, tin, bismuth, indium, lead and their alloys, lead-silver alloys and tin-silver alloys in which the silver proportion is between 0.5 and 15%.

For other applications, the group of preferred materials could well be different.

It goes without saying that the values of integers $K_1$, $K_2$ and $K_3$ may be selected differently to better adapt the frequency speed value to the propagation speeds and to the impedances of the available materials and to the thicknesses imposed by the desired application.

Figure 3:
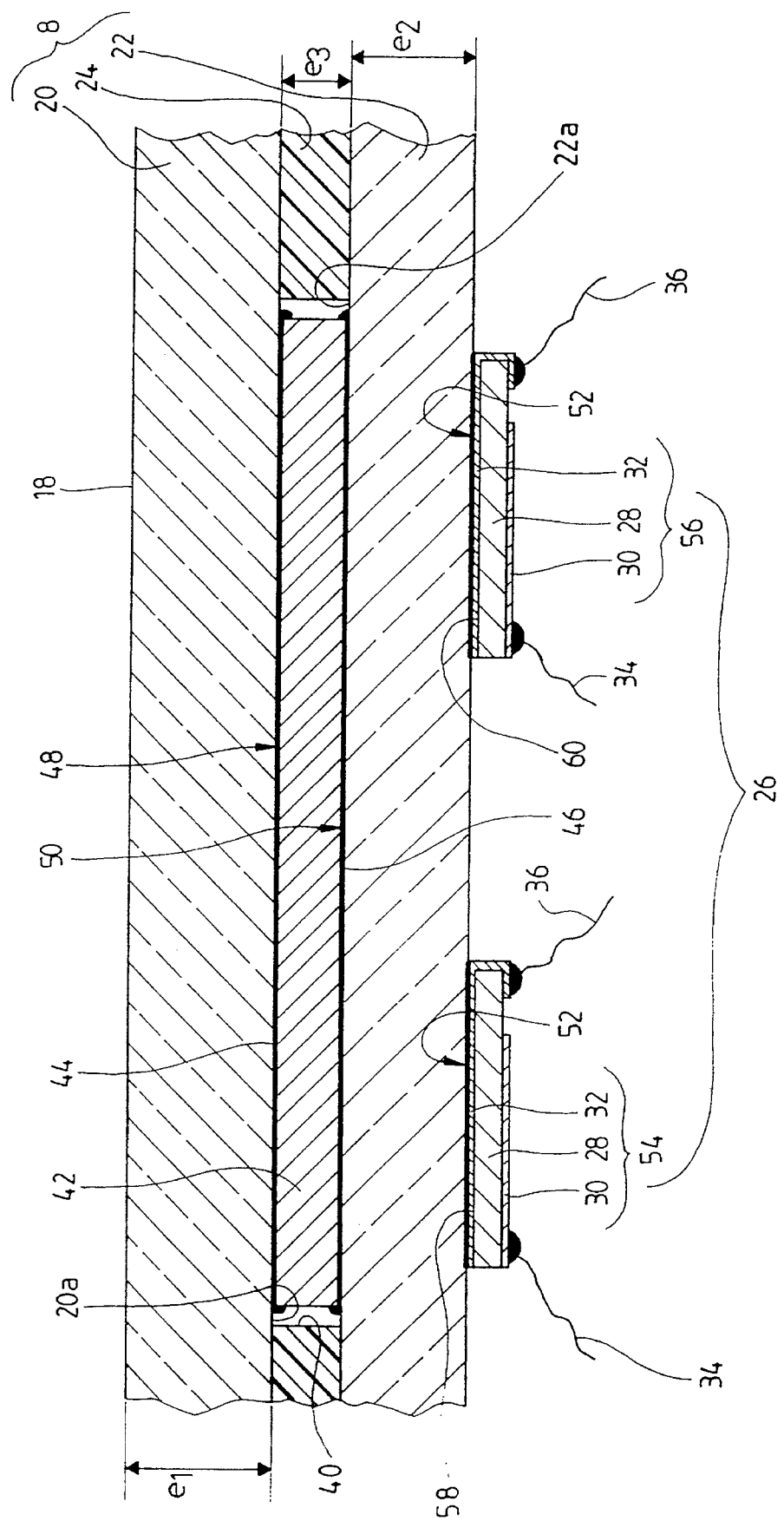
FIG. 3 is a schematical cross-sectional view of a second embodiment of the composite wall according to the invention.

Referring now to FIG. 3, a second embodiment of the invention is shown, in which the same elements as those shown in FIGS. 1 and 2 are designated by the same numerical references.

Unlike the first embodiment, transducer means 26 comprise a first transducer 54 used with a second transducer 56 which is separated from the first by a distance D. The first and second transducers 54, 56 each have a structure similar to that of transducer means 26 of FIG. 2. Transducer 52 comprises an emitting face 58 via which it emits an incidental ultrasonic signal of frequency f in the thickness of windshield 8. Transducer 56 comprises a receiving face 60 via which it receives the signal emitted by transducer 54, after reflection on face 18 of windshield 8 which affects in particular the signal's amplitude characteristics. Also in this second embodiment of the invention, inserted element 42 extends between first and second transducers 54 and 56 facing the latter.

What is claimed is:

1. A composite wall comprising a first sheet having a first thickness, a second sheet having a second thickness, said sheets being separated by an intermediate layer having a third thickness, and an ultrasonic detection device cooperating with an external face of said second sheet to detect the presence of foreign bodies on an external face of said first sheet, said detection device comprising transducer means able to emit an incidental ultrasonic signal of frequency f, said transducer means also being able to receive an ultrasonic signal reflected on said face of said first sheet representative of the presence or absence of said foreign bodies, said intermediate layer comprising, at least facing the transducer means, a recess in which is placed an inserted element having two opposite faces respectively in close contact with the first and second sheets, said frequency f of the transducer means satisfying the following relationships:

$$f \approx K_1 \cdot V_1/2e_1 \approx K_2 \cdot V_2/2e_2 \approx K_3 \cdot V_3/2e_3$$

where $K_1$, $K_2$ and $K_3$ are defined integers, $e_1$, $e_2$ and $e_3$ are respectively the thickness of the first sheet, the thickness of the second sheet and the thickness of the inserted element, and $V_1$, $V_2$ and $V_3$ are respectively the propagation speeds of an ultrasonic wave in the first sheet, in the second sheet and in the inserted element.

2. A composite wall according to claim 1, wherein said first and second sheets are formed of a material with substantially equivalent acoustic impedances, and the material of the inserted element has an acoustic impedance whose value is between approximately 0.6 and approximately 1.7 times the value of that of the first and second sheets.

3. A composite wall according to claim 1, wherein the material of the inserted element is malleable.

4. A composite wall according to claim 1, wherein said first and second sheets are formed of glass, the intermediate layer is a connecting layer, and the material of the inserted element is selected from the group of materials consisting of aluminium, tin, bismuth, indium, lead and their alloys, lead-silver alloys, and tin-silver alloys in which the silver proportion is between 0.5 and 15%.

5. A composite wall according to claim 1, wherein the inserted element is fixed to the first and second sheets by a thin film of an adhesive material having a thickness less than $\lambda/20$, where X is the wavelength of said ultrasonic signal of frequency f in the adhesive material.

6. A composite wall according to claim 5, wherein the adhesive material is a thermomelting material with a fusion temperature less than the softening temperature of the intermediate layer.

7. A composite wall according to claim 1, wherein the transducer means comprises a single transducer element comprising an emitting/receiving face via which said incidental and reflected signals are respectively emitted and received.

8. A composite wall according to claim 1, wherein the transducer means comprises a first transducer element comprising an emitting face via which said incidental signal is emitted and a second transducer element comprising a receiving face via which said reflected signal is received, wherein the first transducer is separated from the second transducer, and wherein the inserted element extends between the first and second transducers and faces the latter.

9. A composite wall according to claim 2, wherein said first and second sheets are formed of glass, the intermediate layer is a connecting layer, and the material of the inserted element is selected from the group of materials consisting of aluminium, tin, bismuth, indium, lead and their alloys, lead-silver alloys, and tin-silver alloys in which the silver proportion is between 0.5 and 15%.

10. A composite wall according to claim 9, wherein the inserted element is fixed to the first and second sheets by a thin film of an adhesive material having a thickness less than $\lambda/20$, where $\lambda$ is the wavelength of said ultrasonic signal of frequency f in the adhesive material.

11. A composite wall according to claim 10, wherein the adhesive material is a thermomelting material with a fusion temperature less than the softening temperature of the intermediate layer.

12. A composite wall according to claim 11, wherein the transducer means comprises a single transducer element comprising an emitting/receiving face via which said incidental and reflected signals are respectively emitted and received.

13. A composite wall according to claim 10, wherein the transducer means comprises a single transducer element comprising an emitting/receiving face via which said incidental and reflected signals are respectively emitted and received.

14. A composite wall according to claim 10, wherein the transducer means comprises a first transducer element comprising an emitting face via which said incidental signal is emitted and a second transducer element comprising a receiving face via which said reflected signal is received, wherein the first transducer is separated from the second transducer, and wherein the inserted element extends between the first and second transducers and faces the latter.

15. A composite wall according to claim 4, wherein the inserted element is fixed to the first and second sheets by a thin film of an adhesive material having a thickness less than $\lambda/20$, where $\lambda$ is the wavelength of said ultrasonic signal of frequency f in the adhesive material.

16. A composite wall according to claim 15, wherein the adhesive material is a thermomelting material with a fusion temperature less than the softening temperature of the intermediate layer.

17. A composite wall according to claim 16, wherein the transducer means comprises a single transducer element comprising an emitting/receiving face via which said incidental and reflected signals are respectively emitted and received.

18. A composite wall according to claim 15, wherein the transducer means comprises a single transducer element comprising an emitting/receiving face via which said incidental and reflected signals are respectively emitted and received.

19. A composite wall according to claim 15, wherein the transducer means comprises a first transducer element comprising an emitting face via which said incidental signal is emitted and a second transducer element comprising a receiving face via which said reflected signal is received, wherein the first transducer is separated from the second transducer, and wherein the inserted element extends between the first and second transducers and faces the latter.

20. A composite wall according to claim 16, wherein the transducer means comprises a first transducer element comprising an emitting face via which said incidental signal is emitted and a second transducer element comprising a receiving face via which said reflected signal is received, wherein the first transducer is separated from the second transducer, and wherein the inserted element extends between the first and second transducers and faces the latter.

* * * * *